UNITED STATES PATENT OFFICE 2,030,761

DIFFERENTIAL SPEED CHANGING GEAR

Alexandre Pédemonte, Alger, Algeria

Application August 10, 1934, Serial No. 739,334
In France October 4, 1933

3 Claims. (Cl. 74—282)

The present invention relates to improvements in differential speed-changing gear.

One of the features of the invention consists in utilizing the irreversibility of an endless screw or worm by employing this worm as a connecting member between the driving part and the driven part of the gear.

A further feature is that the worm is employed, by being rotated in a certain direction, as a differential means, capable of producing a variation between the speed of the driving part and that of the driven part.

A still further feature of the invention is that the worm, on being rotated in a certain direction and at a certain speed, enables such a variation between the speeds of the driving part and the driven part to be effected that the direction of rotation of the latter is reversed, relatively to the direction of rotation of the former.

Reference is made to the accompanying drawings, in which

Figure 1:
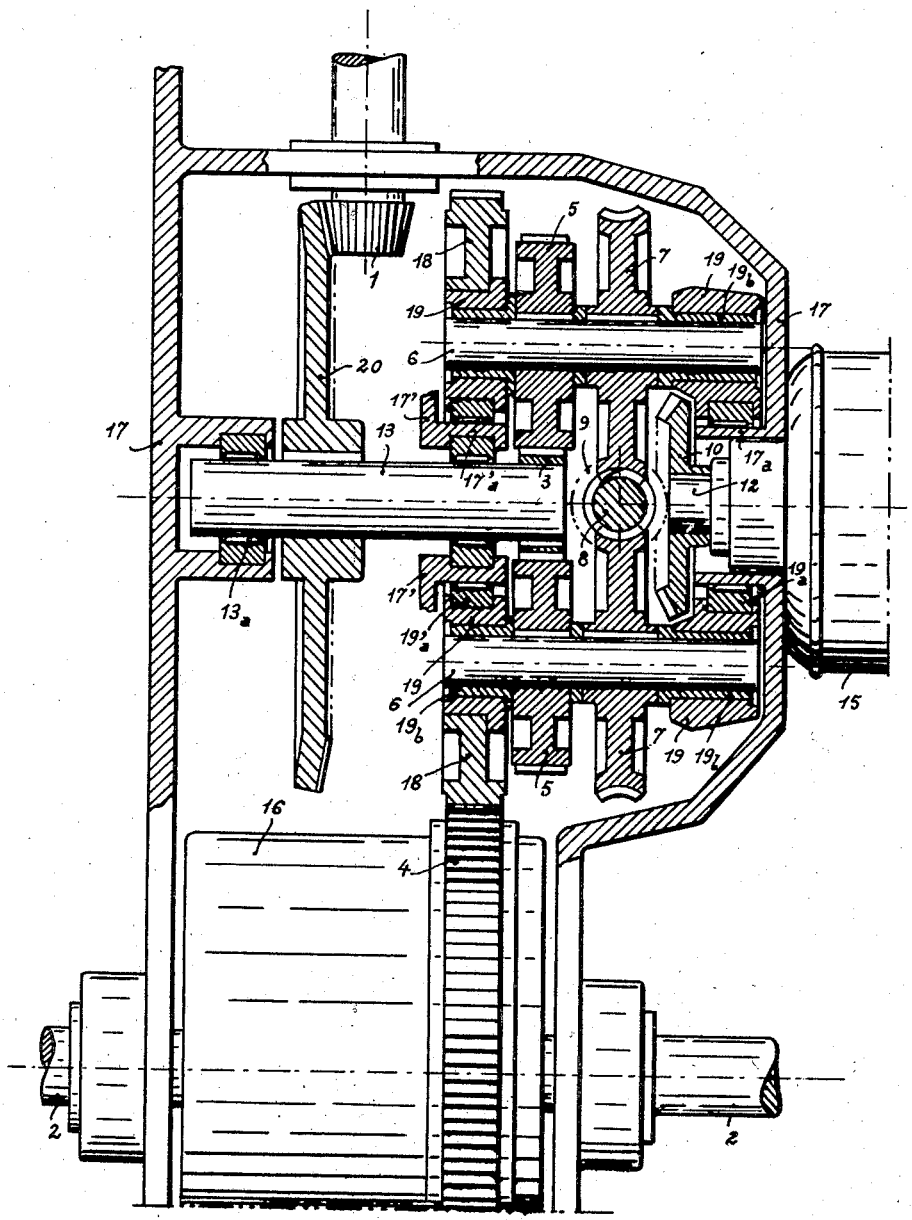
Figures 1 and 2 show the invention, applied to the changing of the speed of the road wheels of an automobile.
Figure 2:
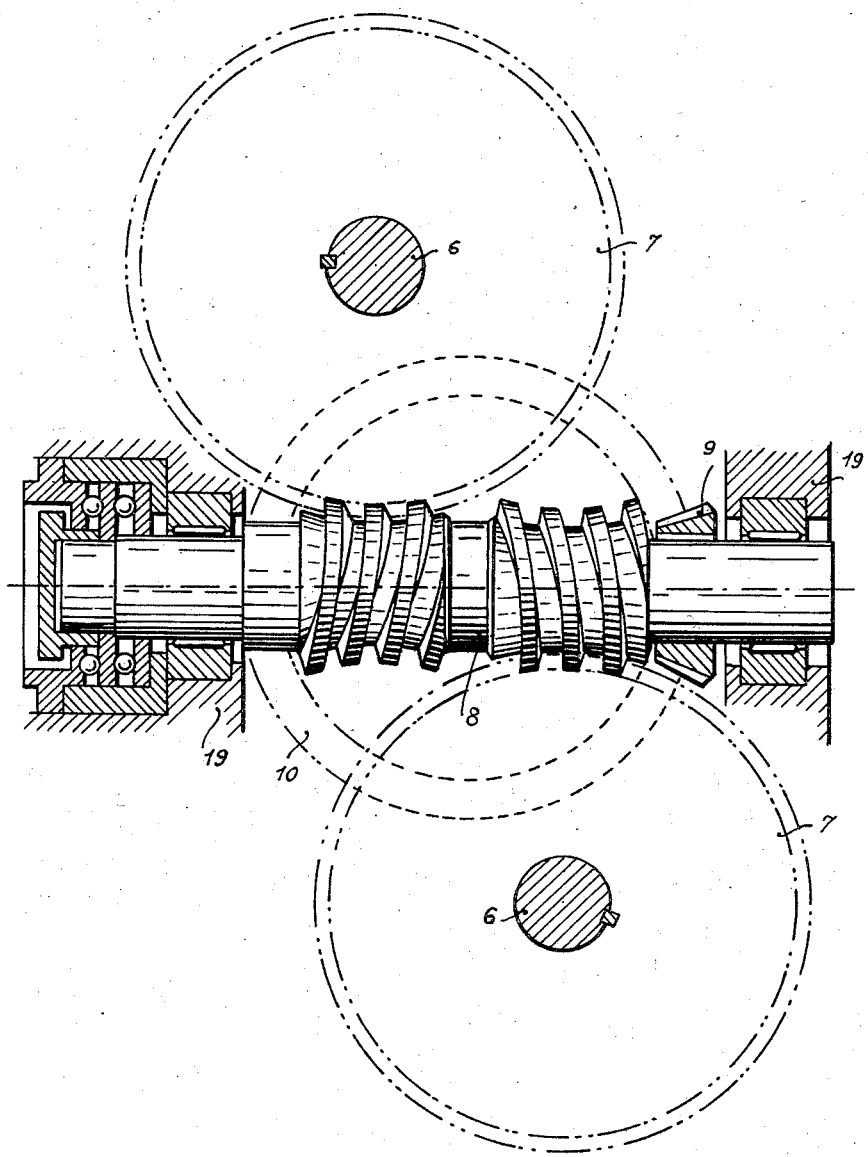

The following is a description of the differential device in accordance with the invention as applied to speed change gear for automobiles, reference being made to the accompanying drawings, Figures 1 and 2.

In this application the driving pinion 1 meshes with a toothed wheel 20 keyed to the shaft 13, which becomes the driving shaft of the device.

This shaft 13 is carried in two ball, roller, needle or the like bearings 13a, mounted on the one hand in a wall of the case 17 protecting the device, and on the other and in a plate 17' arranged within the said case.

To the shaft 13 there is keyed a toothed or sun wheel 3 in mesh with two toothed planet wheels 5. These wheels are keyed to two shafts 6, which pass through bearings 19b mounted in a bush 19, which is substantially cylindrical and which rotates concentrically with the shaft 13 in bearings 19a carried in the shoulders 17'a and 17a of the plate 17' and of the wall of the case 17.

On the outside of the bush 19 there is arranged the toothed crown wheel 18, which meshes with the externally toothed crown wheel 4 of an ordinary automobile differential 16, which thus connects the toothed wheel 18 with the transverse road wheel axles 2, which constitute the driven shafts.

Two worm wheels 7 having spirally cut teeth are also keyed to the shaft 6, and each of these meshes with one side of a worm 8 having two opposite threads, one for each of the wheels 7 (Figure 2).

A pinion 9 is arranged at one end of the worm 8, which pinion meshes with another pinion 10 fixed to the shaft 12.

The shaft 12 lies on the same horizontal axis as the bush 19 and may be driven by the motor of the vehicle itself, or better still by a small electro-motor 15, placed on the end of the device, or again by any other known means.

The method of operation is as follows:

In effect the worm 8 stops the shafts 6 and, in consequence, also stops the pinions 5, which are then interlocked with the pinion 3, that is to say, with the shaft 13 driven by the motor. The bush 19 then turns with the said shaft, and at the same speed as if it were integral with it.

At this moment the motor might be considered as being directly coupled.

But, if the shaft 12 is given a rotatory motion, for example, by means of the motor 15, the pinion 9 and the worm 8 will turn and also the wheels 7 and 5.

The planet wheels 5 will follow this independent movement of the motor and will move around the sun-wheel 3 and the bush 19 will no longer turn at the same speed as the shaft 13.

There ensues in consequence a change of speed on the part of the crown wheel 18, the wheel 4 and the driven shafts 2, that is to say, of the road wheels of the vehicle.

The variations of speed are proportional to the speed of rotation imparted to the shaft 12, that is to say, to the worm 8.

In proportion as the speed of the shaft 12 is increased in the appropriate direction, the speed of the wheel 18 is decreased until the wheel stops completely and then it begins to turn in the reverse direction, its speed increasing continuously with that of the shaft 12.

During this time the motor and the shaft 13 have not varied their speeds, and all the variations in speed between the driving shaft and the driven take place in a continuous manner.

The maximum speed is again progressively attained by reducing the speed of the shaft 12 until the worm 8 stops, that is, when direct coupling occurs.

Higher speeds than that due to direct coupling could obviously be attained by reversing the direction of rotation of the shaft 12.

Figure 3:
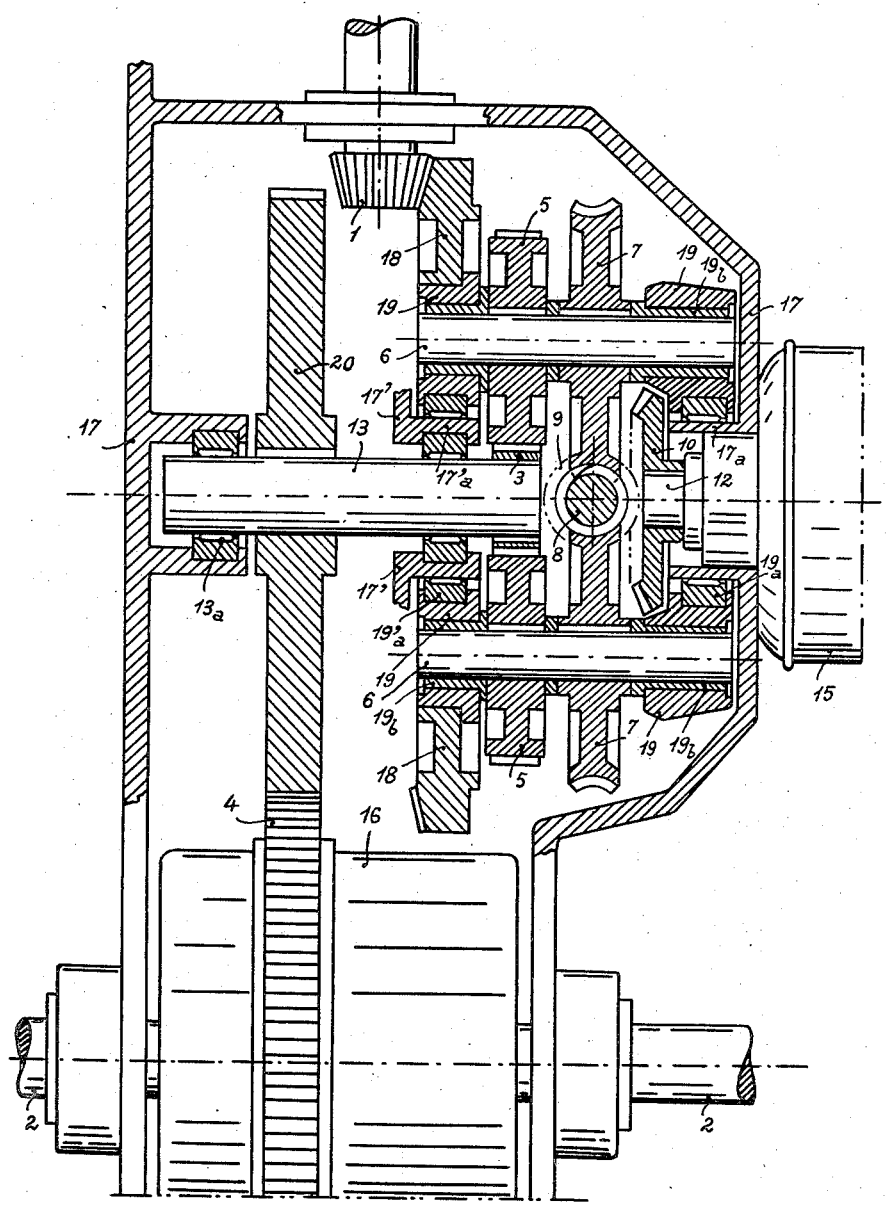
Figure 3 shows the invention in a reversed position.

This device could be also reversed, viz. the shaft 1 can cooperate with the wheel 18, and the toothed wheel 20 can mesh with the toothed crown 4 of the differential of the wheels 2 (Figure 3).

It is apparent that the device herein described may be modified in design and in details of construction with a view to adapting it to particular requirements, without however departing from the spirit of the invention.

What I claim is:—

1. In a differential speed-changing gear for automobiles, a driving shaft, two driving axles for the road wheels of the vehicle, a differential means connecting the two driving axles of the road wheels, a sun pinion wheel keyed to the driving shaft, two planet pinions engaging the sun pinion wheel, two shafts on which the planet pinion wheels are mounted, a bush turning freely around the driving shaft and carrying the shafts of the planet pinion wheels, a toothed crown wheel external to the bush and meshing with the differential means for the actuation of the axles of the road wheels, two worm wheels keyed to the shafts on which the planet pinion wheels are mounted, an irreversible worm with two opposite threads meshing with the said worm wheels and preventing the said wheels, and in consequence the shafts on which they are mounted, from turning in order to make the bush interlocked with the driving shaft and to actuate the road wheels of the vehicle.

2. In a differential speed-changing gear for automobiles, a driving shaft, two driving axles for the road wheels of the vehicle, a differential means connecting the two driving axles of the road wheels, a sun pinion wheel keyed to the driving shaft, two planet pinions engaging the sun pinion wheel, two shafts on which the planet pinion wheels are mounted, a bush turning freely around the driving shaft, and carrying the shafts of the planet pinion wheels, a toothed crown wheel external to the bush and meshing with the differential means for the actuation of the axles of the road wheels, two worm wheels keyed to the shafts on which the planet pinion wheels are mounted, an irreversible worm with two opposite threads meshing with the said worm wheels, and preventing the said wheels, and in consequence the shafts on which they are mounted, from turning in order to make the bush interlocked with the driving shaft and to actuate the road wheels of the vehicle, a shaft actuated from an external source, a bevel gear wheel at the end of the said shaft and meshing with a bevel gear wheel at the end of the worm, in order that, consequent upon the rotation of the said externally actuated shaft, the worm rotates and causes a differential effect between the speed of the driving shaft and that of the bush and, in consequence, that of the road wheels of the vehicle.

3. In a differential speed-changing gear for automobiles, a driving shaft, a toothed pinion keyed to the driving shaft, two driving axles for the road wheels of the vehicle, a differential means connecting the two driving axles of the road wheels, a sun pinion wheel keyed to the driven shaft, two planet pinions engaging the sun pinion wheel, two shafts on which the planet pinion wheels are mounted, a bush turning freely around the driven shaft, and carrying the shafts of the planet pinion wheels, a toothed crown wheel external to the bush and meshing with the pinion keyed to the driving shaft, a toothed wheel keyed to the driven shaft, and meshing with the differential means for the actuation of the axles of the road wheels, two worm wheels keyed to the shafts on which the planet pinion wheels are mounted, an irreversible worm with two opposite threads meshing with the said worm wheels, and preventing the said wheels, and in consequence the shafts on which they are mounted, from turning in order to make the bush interlocked with the driven shaft and to actuate from an external source, a bevel gear wheel at the end of the said shaft and meshing with a bevel gear wheel at the end of the worm, in order that, consequent upon the rotation of the said externally actuated shaft, the worm rotates and causes a differential effect between the speed of the driven shaft and that of the bush and, in consequence, that of the road wheels of the vehicle.

ALEXANDRE PÉDEMONTE.